United States Patent
Ohl, Jr. et al.

(10) Patent No.: US 10,107,255 B2
(45) Date of Patent: Oct. 23, 2018

(54) GEARBOX REPAIR APPARATUS

(71) Applicant: General Electric Company, Schenectady, NY (US)

(72) Inventors: Richard Arland Ohl, Jr., Hudson, NY (US); Gregory Clarence Thomas, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 476 days.

(21) Appl. No.: 14/687,996

(22) Filed: Apr. 16, 2015

(65) Prior Publication Data
US 2016/0305397 A1 Oct. 20, 2016

(51) Int. Cl.
| | |
|---|---|
| *B23B 41/12* | (2006.01) |
| *F03D 80/50* | (2016.01) |
| *B25B 27/02* | (2006.01) |
| *B23Q 9/02* | (2006.01) |
| *F03D 1/00* | (2006.01) |
| *B23B 29/02* | (2006.01) |
| *B23Q 9/00* | (2006.01) |

(52) U.S. Cl.
CPC .............. *F03D 1/003* (2013.01); *B23B 29/02* (2013.01); *B23B 29/027* (2013.01); *B23B 41/12* (2013.01); *B23Q 9/0007* (2013.01); *B23Q 9/0028* (2013.01); *B23Q 9/02* (2013.01); *B25B 27/02* (2013.01); *F03D 80/50* (2016.05); *B23B 2215/76* (2013.01); *Y02E 10/72* (2013.01); *Y10T 29/49726* (2015.01); *Y10T 29/5108* (2015.01); *Y10T 29/53796* (2015.01); *Y10T 408/5622* (2015.01)

(58) Field of Classification Search
CPC ........... Y10T 29/5108; Y10T 408/5635; Y10T 408/563; Y10T 408/5622; Y10T 408/567; Y10T 29/49718–29/4975; B23B 29/027; B23B 41/12; B23B 2270/08; B23B 2215/76; B23Q 2709/00
USPC ............... 29/26 B, 402.01–402.21, 244–268; 408/108, 103, 94, 115 R
See application file for complete search history.

(56) References Cited

U.S. PATENT DOCUMENTS

| | | | | |
|---|---|---|---|---|
| 8,265 A | * | 7/1851 | Moore | ..................... B23Q 9/00 408/94 |
| 8,761 A | * | 2/1852 | Sidle | ........................ B23Q 9/00 408/94 |

(Continued)

OTHER PUBLICATIONS

Co-Pending U.S. Appl. No. 14/687,976, filed Apr. 16, 2015.

*Primary Examiner* — Erica E Cadugan
(74) *Attorney, Agent, or Firm* — Dority & Manning, P.A.

(57) ABSTRACT

The present disclosure is directed to a gearbox repair apparatus for repairing a bore hole of a gearbox torque arm. In certain embodiments, the apparatus includes a mounting structure configured to mount to the torque arm. The mounting structure includes a through hole that aligns with the bore hole of the torque arm when mounted thereto. As such, when mounted to the torque arm, the mounting structure is configured to locate a boring bar at a center of the bore hole such that the boring bar is perpendicular to a face of the torque arm. Further, the mounting structure is configured to receive the boring bar through the aligned through hole and bore hole such that, when inserted therethrough, the boring bar is configured to machine and thus repair the bore hole.

6 Claims, 11 Drawing Sheets

(56) References Cited

U.S. PATENT DOCUMENTS

| | | | | |
|---|---|---|---|---|
| 74,062 A * | 2/1868 | Emerson | B27C 9/00 | 408/94 |
| 1,187,992 A * | 6/1916 | Heiser | B23Q 9/00 | 408/94 |
| 1,512,998 A * | 10/1924 | Muehlberg | B23Q 9/00 | 408/94 |
| 1,953,402 A * | 4/1934 | Graham | B23B 29/02 | 408/94 |
| 2,602,238 A * | 7/1952 | Wellman | B23B 47/288 | 144/27 |
| 4,346,508 A * | 8/1982 | Baumann | B23B 41/00 | 408/94 |
| 5,033,177 A * | 7/1991 | Gathright | B25B 27/062 | 29/264 |
| 7,721,434 B2 | 5/2010 | Weaver et al. | | |
| 8,186,031 B2 * | 5/2012 | Whitney | B25B 27/062 | 29/258 |
| 8,794,922 B2 | 8/2014 | Bart et al. | | |
| 2015/0056033 A1 * | 2/2015 | Esslinger | B23B 29/027 | 408/110 |
| 2016/0305532 A1 * | 10/2016 | Ohl, Jr. | F16H 57/025 | |

\* cited by examiner

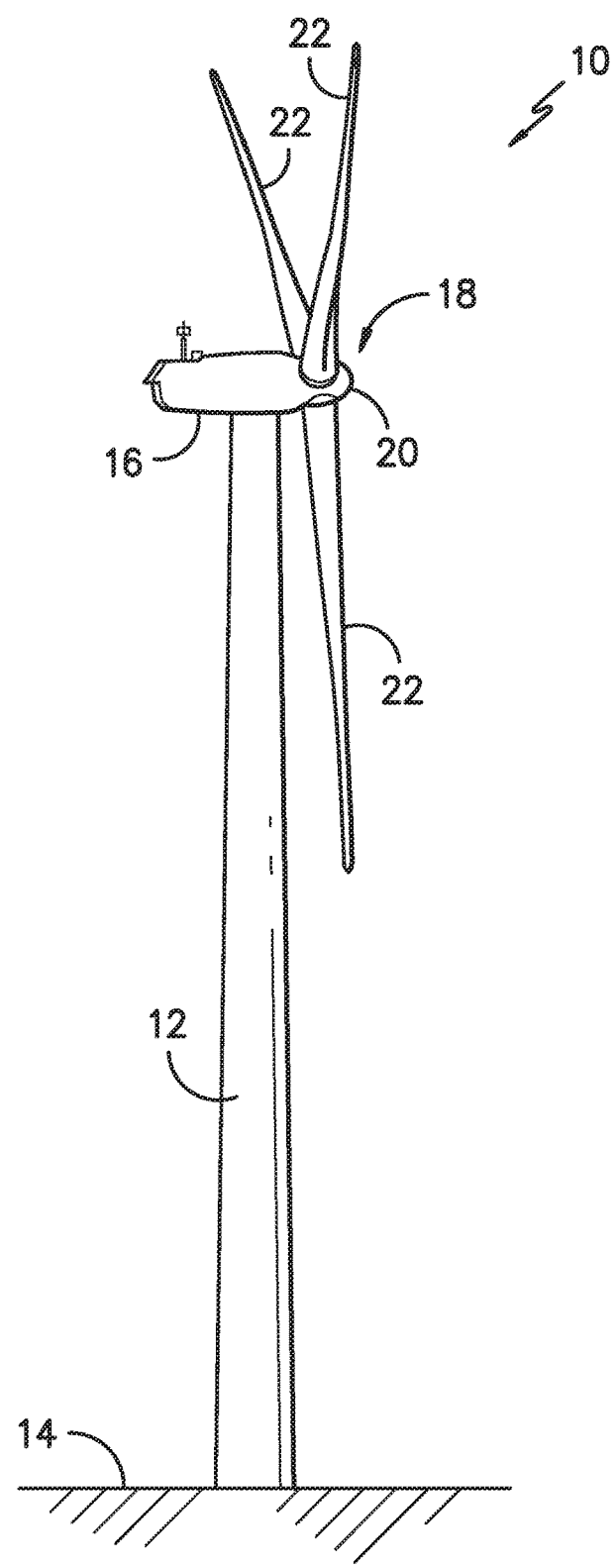
FIG. -1-
PRIOR ART

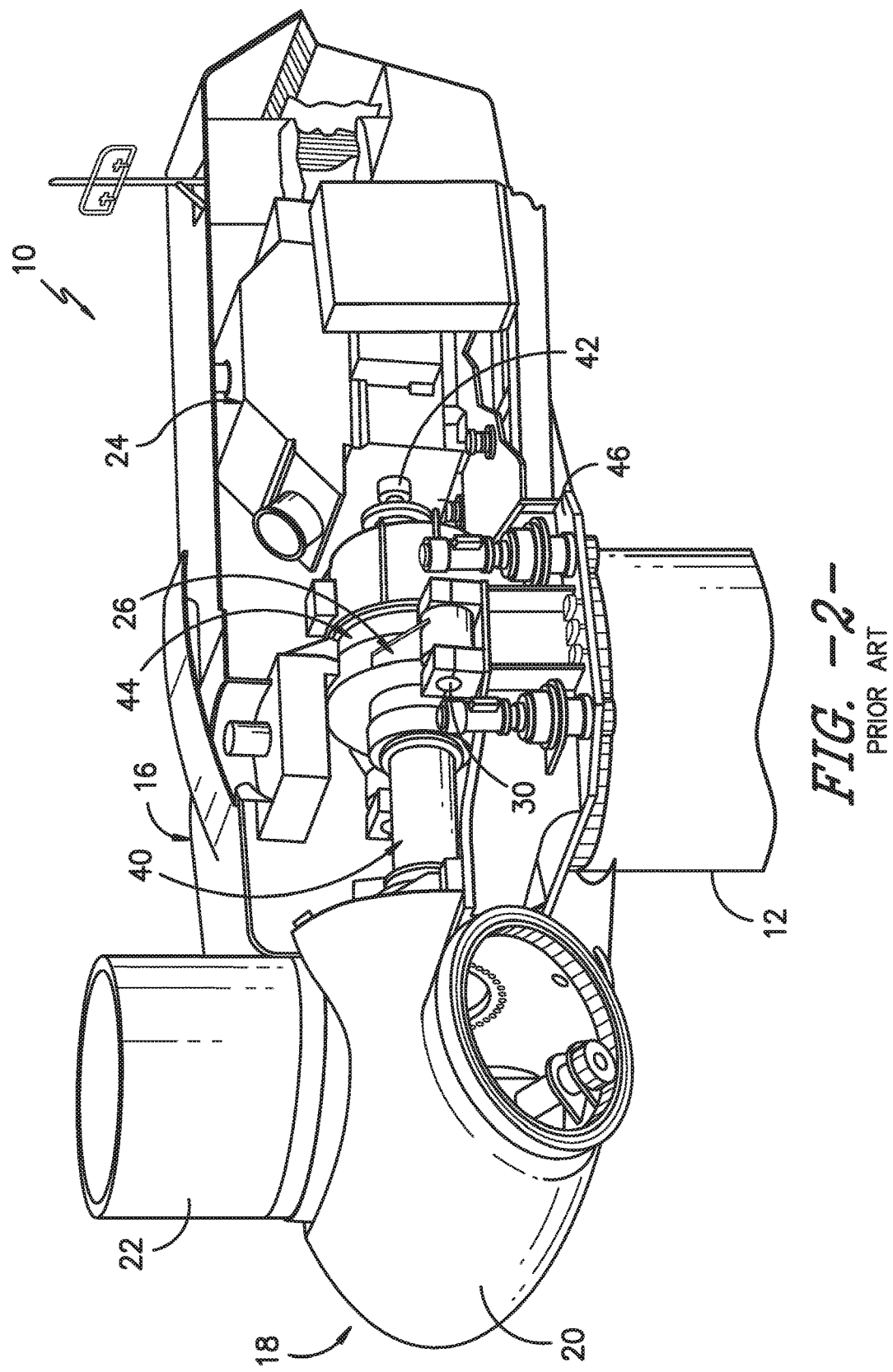
FIG. -2-
PRIOR ART

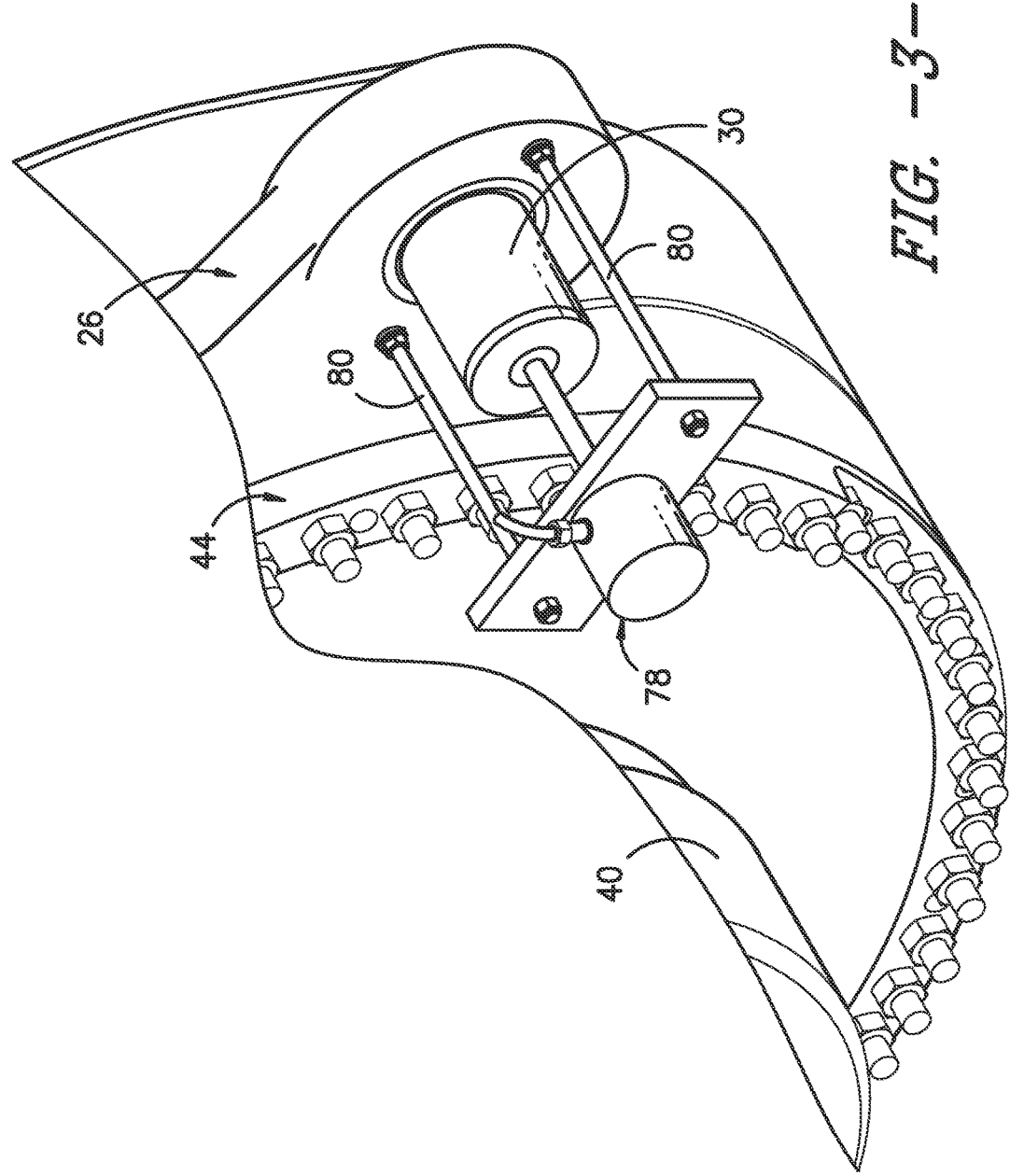
FIG. -3-

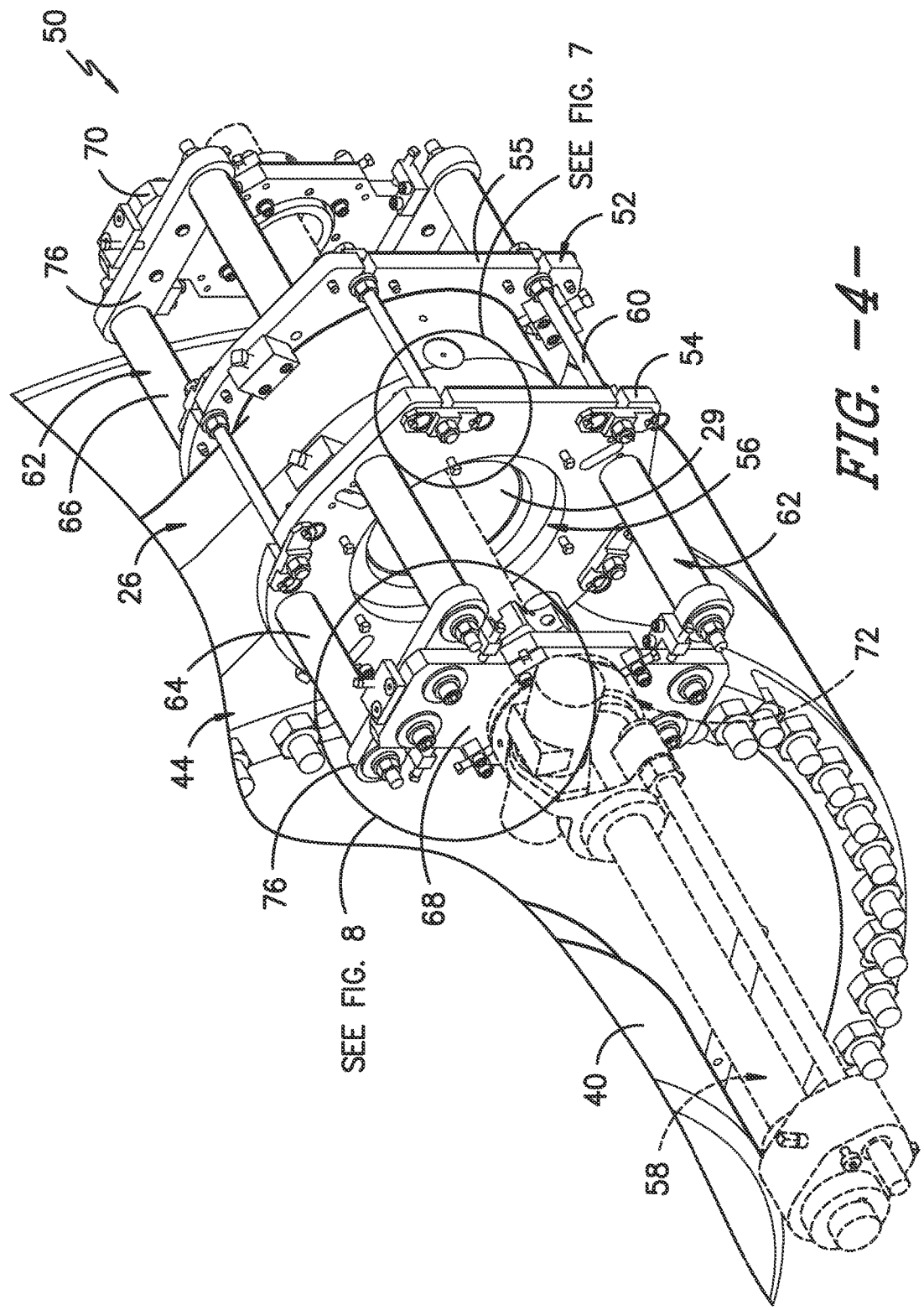

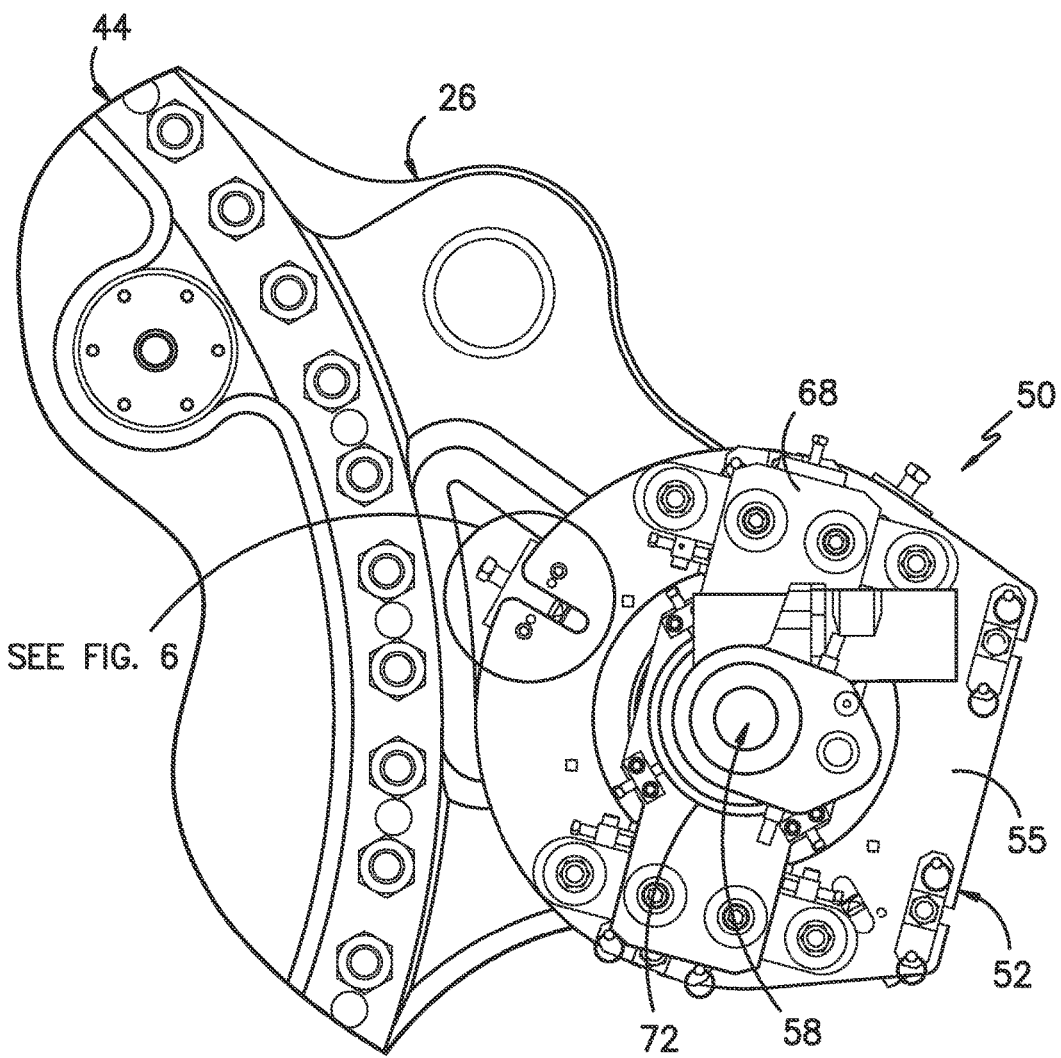
FIG. -5-

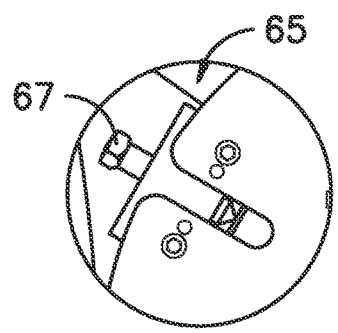
FIG. -6-
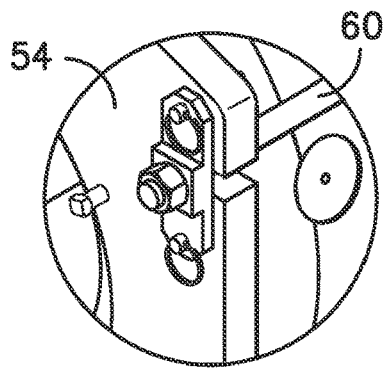
FIG. -7-
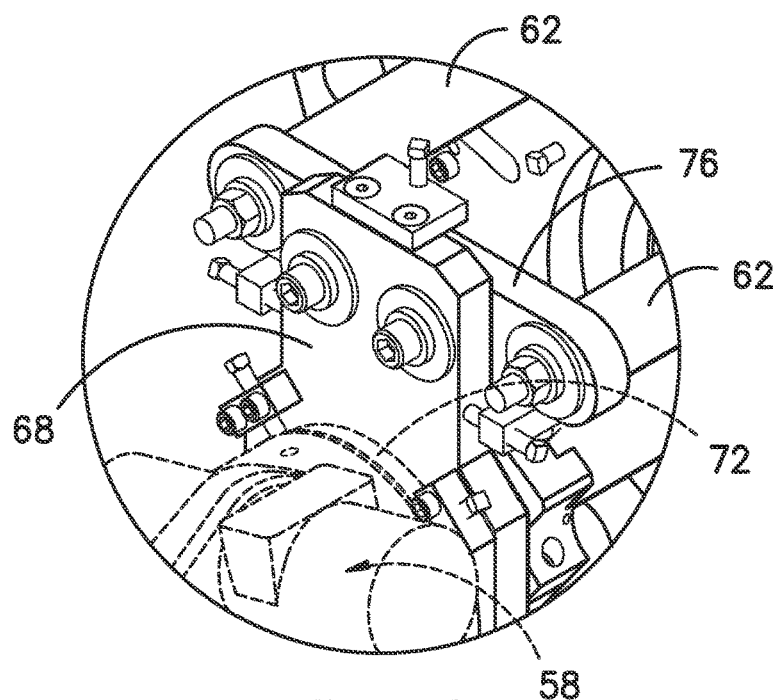
FIG. -8-

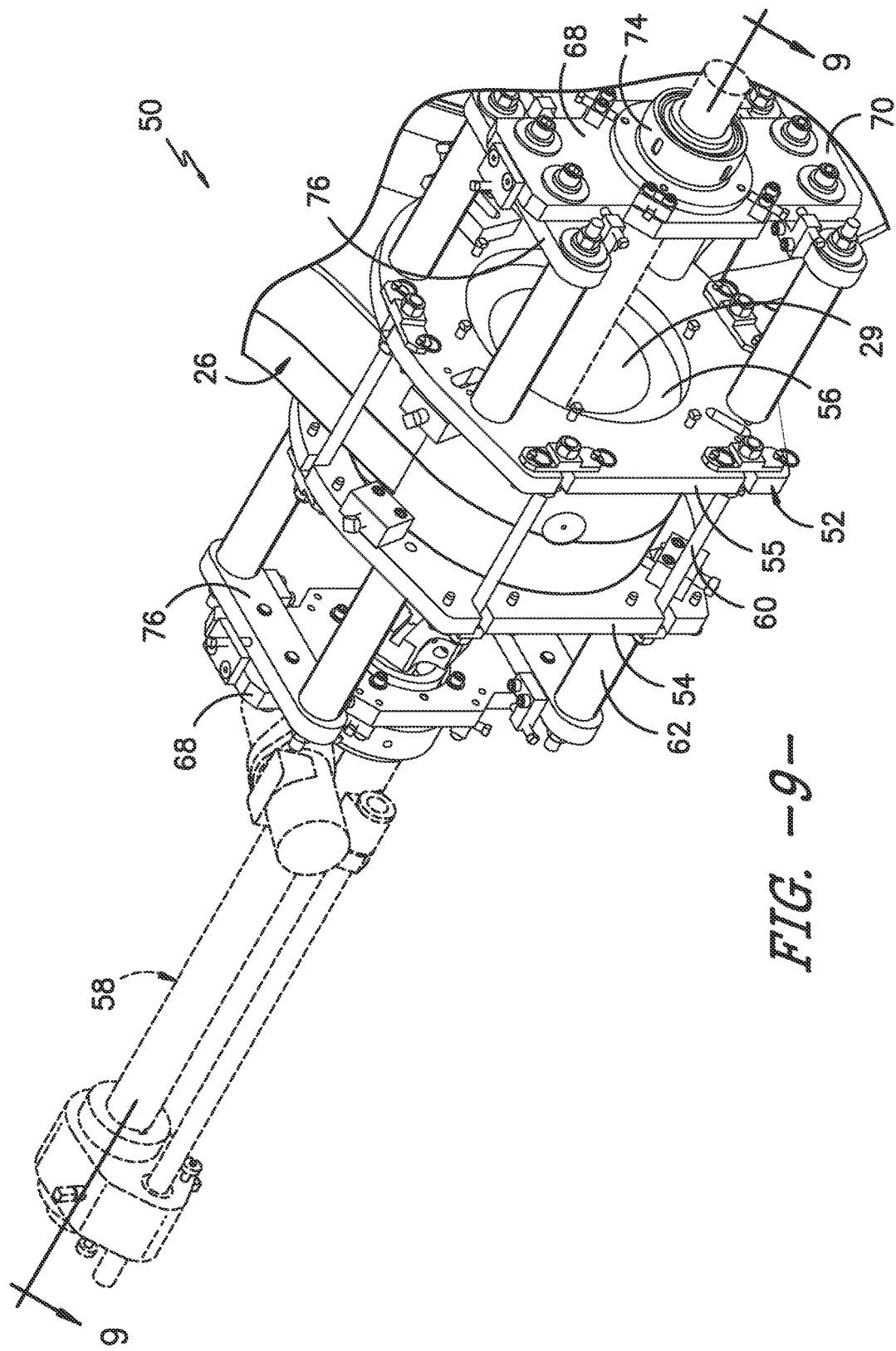
FIG. -9-

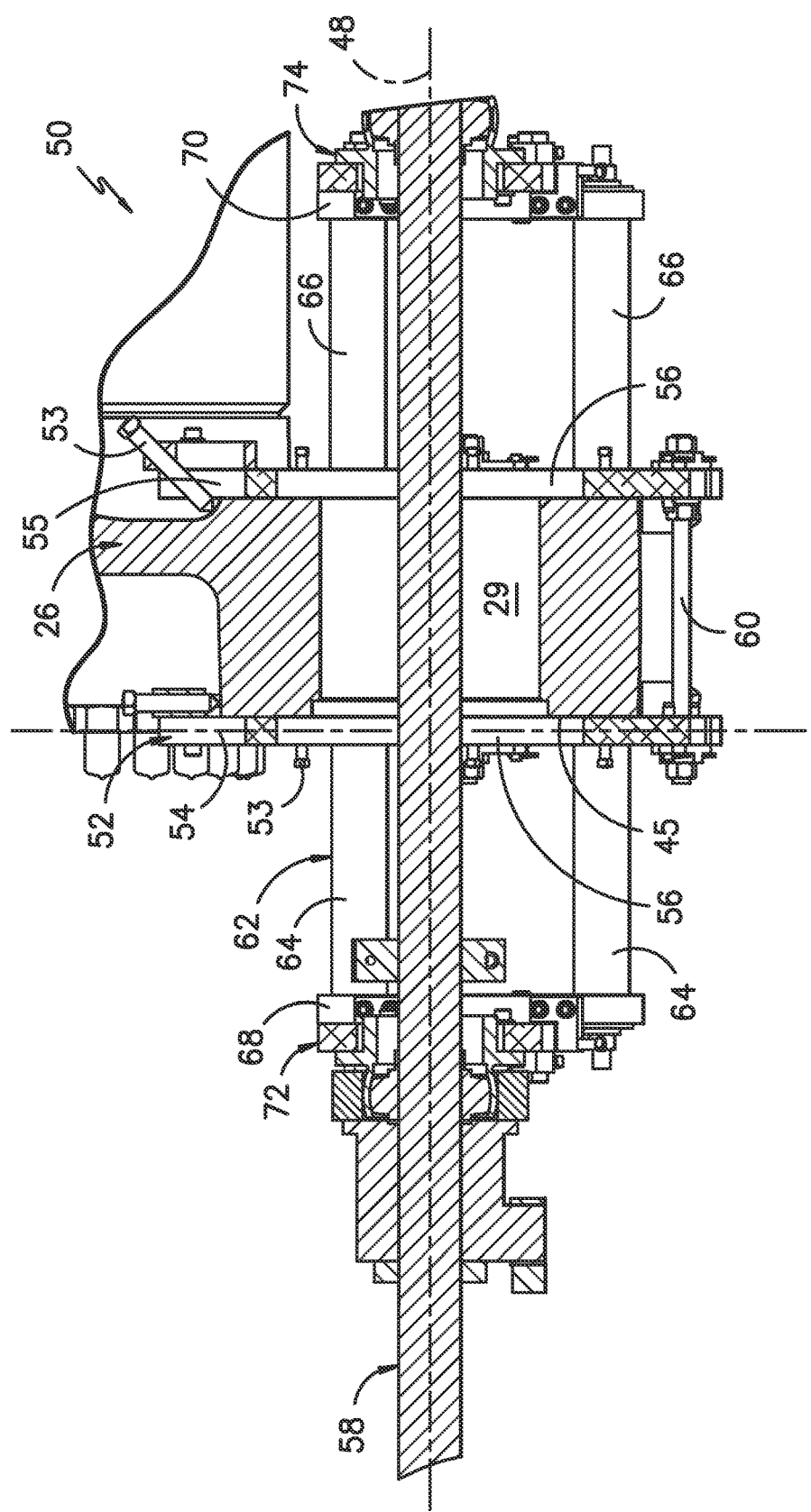
FIG. -10-

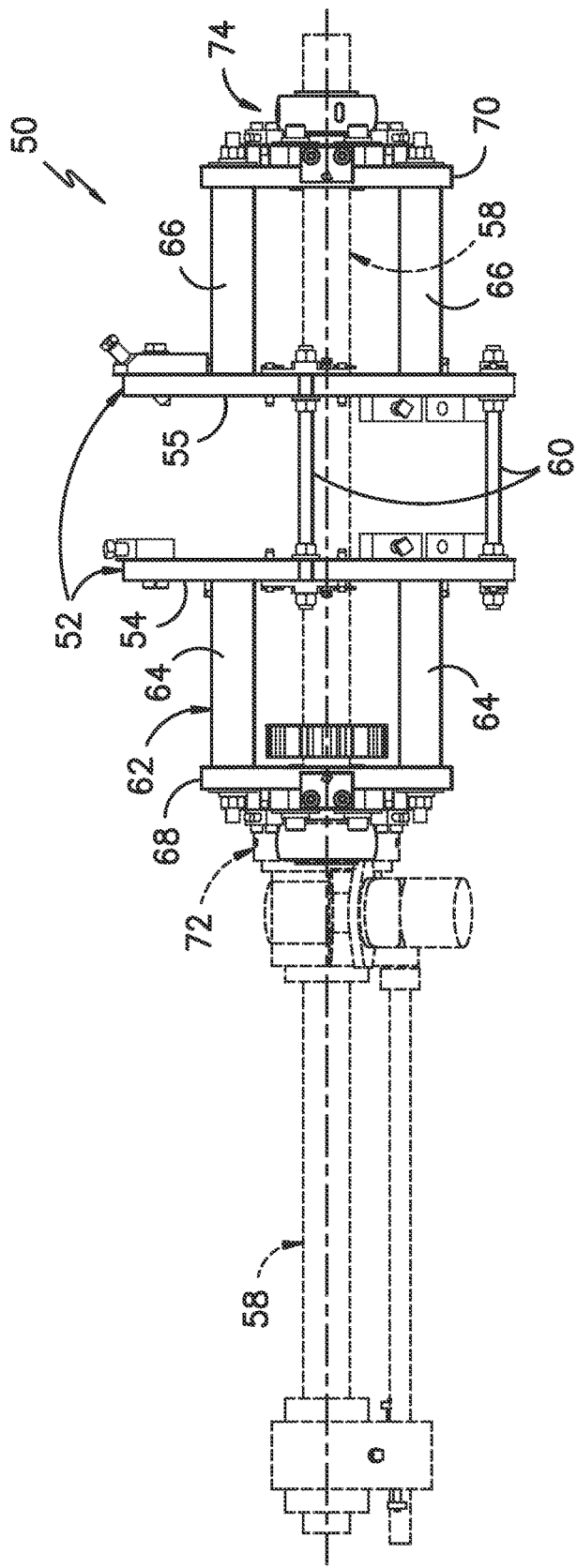
FIG. -11-

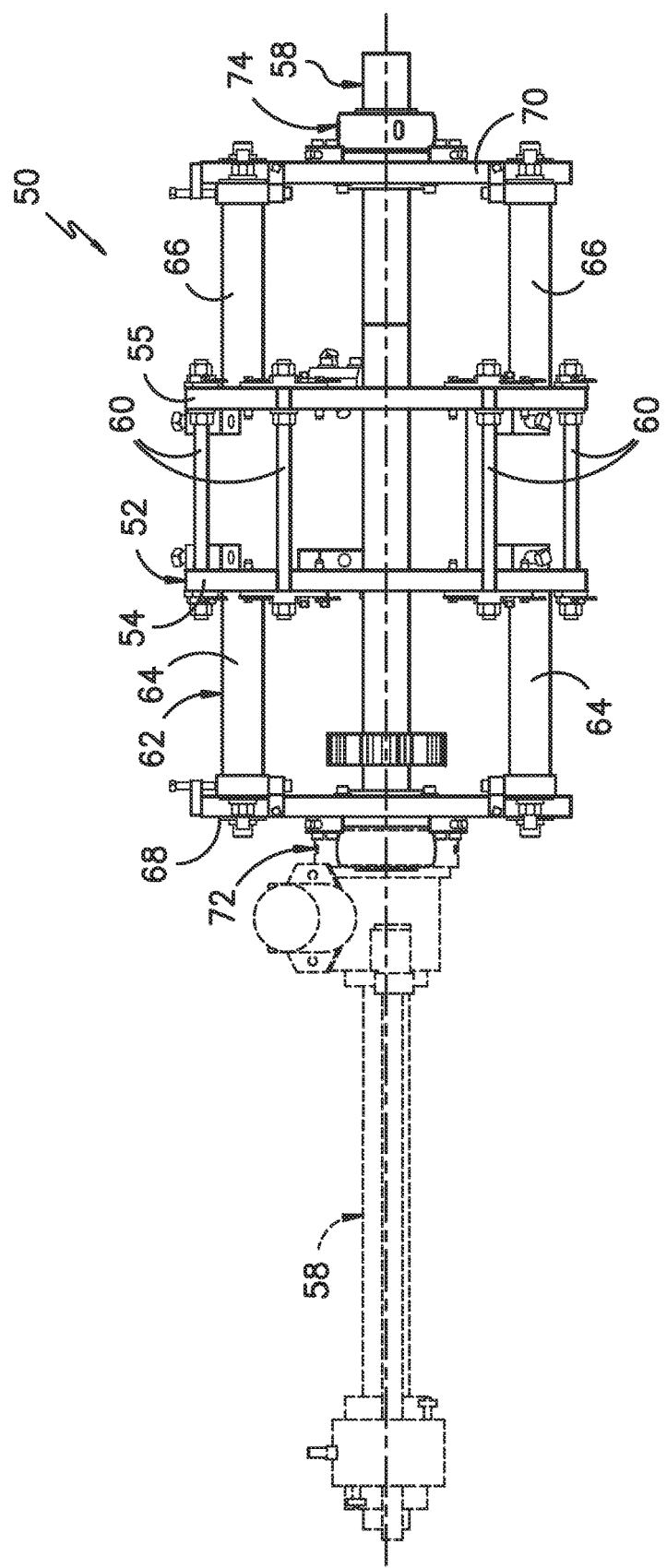
FIG. -12-

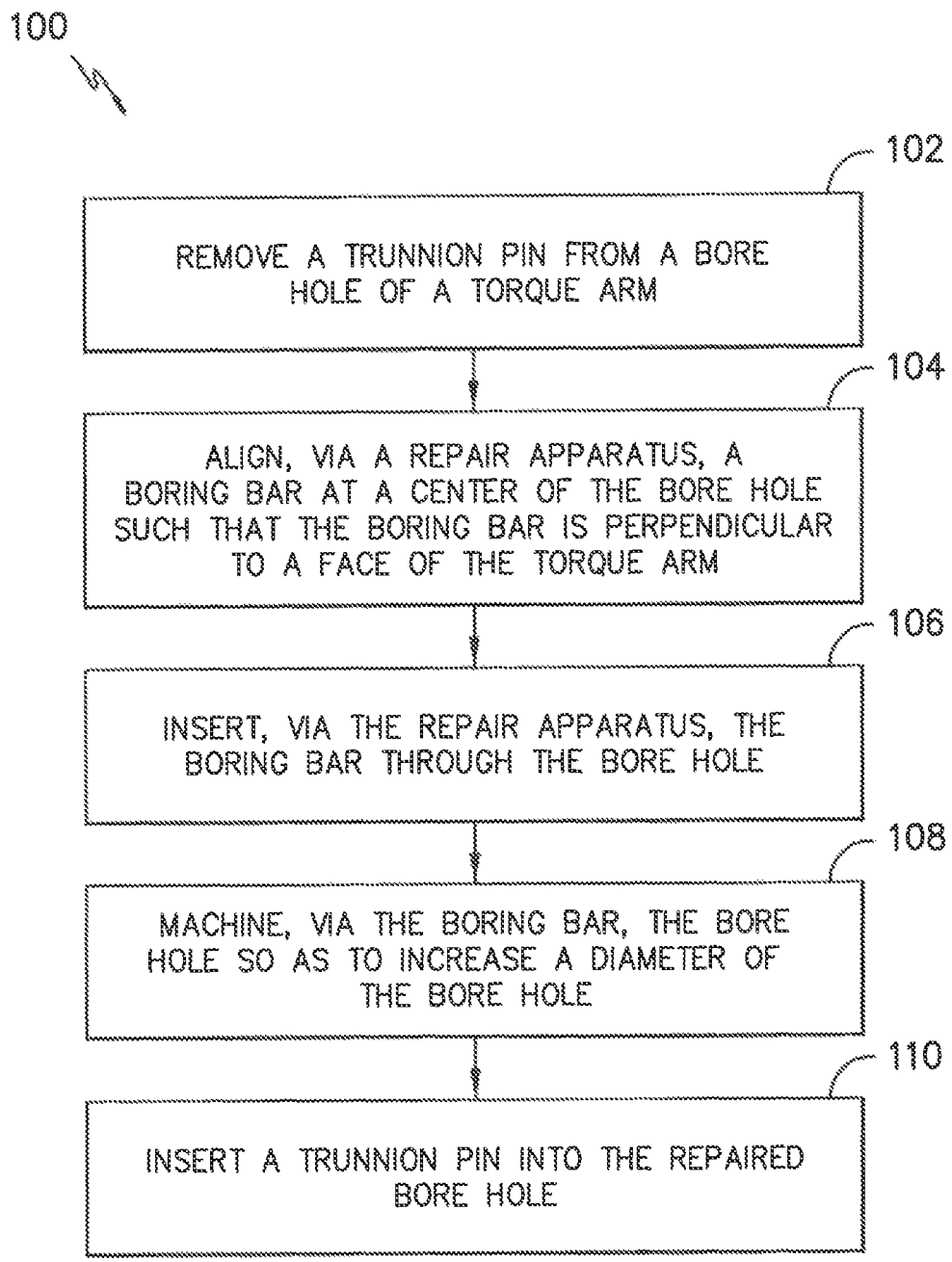
FIG. -13-

GEARBOX REPAIR APPARATUS

FIELD OF THE INVENTION

The present disclosure relates generally to wind turbines, and more particularly to a gearbox repair apparatus for a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and a blade root of the rotor blade to allow for rotation about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

During operation, the gearbox may need to be repaired uptower due to normal wear and tear and/or excessive loading. For example, in some instances, the trunnion pins that secure the gearbox to the bedplate via the torque arms and/or their corresponding bore holes may become worn. More specifically, the trunnion bore holes may experience severe galling due to excessive loading and may become egg-shaped. As such, the gearbox may become displaced as the lose pins become ineffective at restraining the gearbox during operation. Repair of such pins is difficult, if not impossible, as the gearbox typically shifts during operation and is too heavy to move uptower.

As such, an improved apparatus for repairing damaged trunnion bores and pins would be advantageous. Accordingly, the present disclosure is directed to a gearbox repair apparatus configured to repair such bores uptower, as well as install new trunnion pins.

BRIEF DESCRIPTION OF THE INVENTION

Aspects and advantages of the invention will be set forth in part in the following description, or may be obvious from the description, or may be learned through practice of the invention.

In one aspect, the present disclosure is directed to an apparatus for repairing a bore hole of a gearbox torque arm. The apparatus includes a mounting structure configured to mount to the torque arm. The mounting structure includes a through hole that aligns with the bore hole of the torque arm when mounted thereto. As such, when mounted to the torque arm, the mounting structure is configured to locate a boring bar at a center of the bore hole such that the boring bar is perpendicular to a face of the torque arm. Further, the mounting structure is configured to receive the boring bar through the aligned through hole and bore hole such that, when inserted therethrough, the boring bar is configured to machine and thus repair the bore hole.

In one embodiment, the mounting structure includes a first mounting plate and a second mounting plate with the first and second mounting plates being configured to mount on opposite sides of the gearbox torque arm. Further, in another embodiment, the first and second mounting plates are mounted to opposite sides of the torque arm via at least one of one or more clamps or one or more fasteners. In additional embodiments, the first and second mounting plates are secured to each other when mounted to opposite sides of the torque arm via one or more connecting members.

In further embodiments, the apparatus may also include a plurality of support members. For example, in certain embodiments, the plurality of support members may include a first set of support members mounted to the first mounting plate and a second set of support members mounted to the second mounting plate. As such, in another embodiment, the apparatus may also include a first end plate mounted to the first set of support members and a second end plate may be mounted to the second set of support members. In addition, the apparatus may also include a first support bearing and a second support bearing configured with the first end plate and the second end plate, respectively. As such, the first and second support bearings are configured to locate the boring bar at the center of the bore hole such that the boring bar is perpendicular to a face of the torque arm. By locating the boring bar in this manner, the bar is configured to machine a new, round bore hole.

In still additional embodiments, the apparatus may include one or more connecting plates configured between the first end plate and the first set of support members and/or the second end plate and the second set of support members, respectively.

In particular embodiments, the apparatus also includes a pulling device configured to remove a trunnion pin from the bore hole. In addition, the pulling device may also be configured to pull a trunnion pin into the repaired bore hole of the torque arm. In further embodiments, the boring bar is configured to repair the bore hole by machining the bore hole so as to increase a diameter of the bore hole.

In another aspect, the present disclosure is directed to an apparatus for repairing a bore hole of a gearbox torque arm. The apparatus includes a mounting structure having one or more mounting plates. Each of the mounting plates has corresponding through holes such that, when mounted to the torque arm, the through holes align with the bore hole of the torque arm. As such, when mounted to the torque arm, the one or more mounting plates are configured to locate a boring bar at a center of the bore hole such that the boring bar is perpendicular to a face of the torque arm. Further, the corresponding through holes of the one or more mounting plates receive the boring bar such that, when inserted therethrough, the boring bar repairs the bore hole.

In yet another aspect, the present disclosure is directed to a method for repairing a bore hole of a gearbox torque arm. The method includes removing a trunnion pin from the bore hole. The method also includes aligning, via a repair apparatus, a boring bar at a center of the bore hole such that the boring bar is perpendicular to a face of the torque arm. Another step includes inserting, via the repair apparatus, the boring bar through the bore hole. The method also includes machining, via the boring bar, the bore hole so as to increase a diameter of the bore hole. A further step includes inserting a trunnion pin into the larger, repaired bore hole.

In one embodiment, the step of aligning the boring bar at the center of the bore hole may include locating the boring bar on a support bearing of the mounting structure.

In another embodiment, the step of inserting the trunnion pin into the repaired bore hole may further include cooling the trunnion pin so as to shrink the pin, heating the torque arm such that the torque arm expands, and pulling, via a pulling device, the trunnion pin into the repaired trunnion bore hole. As such, when the trunnion pin warms up and the torque arm cools back down, the trunnion pin is securely installed within the torque arm via a shrink fit. In particular embodiments, for example, the pulling device may include a hydraulic pulling device. In another embodiment, the method may also include restraining the gearbox torque arm, via a gearbox restraint device, during machining of the bore hole.

It should also be understood that the repair apparatus may be further configured according to any of the additional embodiments having any one of or combination of features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a wind turbine according to conventional construction;

FIG. 2 illustrates a detailed, internal view of a nacelle of a wind turbine according to conventional construction;

FIG. 3 illustrates a perspective view of one embodiment of a gearbox torque arm having a pulling device according to the present disclosure mounted thereto;

FIG. 4 illustrates a perspective view of one embodiment of a gearbox repair apparatus mounted to a gearbox torque arm according to the present disclosure;

FIG. 5 illustrates an end view of one embodiment of a gearbox repair apparatus mounted to a gearbox torque arm according to the present disclosure;

FIG. 6 illustrates a detailed view of an adjustment component of the gearbox repair apparatus of FIG. 4;

FIG. 7 illustrates a detailed view of an interface between a mounting plate and a connecting member of the gearbox repair apparatus of FIG. 3;

FIG. 8 illustrates a detailed view of the gearbox repair apparatus of FIG. 3, particularly illustrating an interface between a boring bar, an end plate, a connecting plate, and support members;

FIG. 9 illustrates a perspective view of another embodiment of a gearbox repair apparatus mounted to a gearbox torque arm according to the present disclosure;

FIG. 10 illustrates a cross-sectional view of the gearbox repair apparatus of FIG. 9 along line 10-10

FIG. 11 illustrates a top view of one embodiment of a gearbox repair apparatus according to the present disclosure;

FIG. 12 illustrates an elevation view of one embodiment of a gearbox repair apparatus according to the present disclosure; and FIG. 13 illustrates a flow diagram of one embodiment of a method for repairing a bore hole of a gearbox torque arm according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a repair apparatus for repairing a bore hole of gearbox torque arm or trunnion. For example, the apparatus includes a mounting structure configured to mount to the torque arm. Further, the mounting structure includes a through hole that aligns with the bore hole of the torque arm when mounted thereto. As such, when mounted, the mounting structure is configured to locate a boring bar at a center of the bore hole such that the boring bar is perpendicular to a face of the torque arm. Accordingly, the boring bar can be inserted within the mounting structure through the aligned through hole and bore hole and can repair the bore hole by machining the hole to increase its diameter. The apparatus is also configured to pull a new trunnion pin within the repaired trunnion bore hole.

The present disclosure includes many advantages not present in the prior art. For example, the apparatus of the present disclosure allows for uptower repair of wind turbine gearboxes that otherwise could not be repaired. In addition, the present disclosure decreases repair and/or maintenance costs and associated time. Further, the present disclosure is configured to create a new, larger bore hole that is round and free of defects. As such, the apparatus of the present disclosure allows for repair and replacement of trunnion holes/pins and does not require the gearbox to be in a certain location since the boring bar references the mounting structure. Accordingly, the trunnion holes/pins can be easily repaired even when the gearbox has shifted during operation.

Referring now to the drawings, FIG. 1 illustrates a perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Referring now to FIG. 2, a simplified, internal view of one embodiment of the nacelle 16 of the wind turbine 10 of FIG. 1 is illustrated. As shown, the generator 24 may be disposed within the nacelle 16. In general, the generator 24 may be coupled to the rotor 18 of the wind turbine 10 for generating electrical power from the rotational energy generated by the rotor 18. For example, the rotor 18 may include a main rotor shaft 40 coupled to the hub 20 for rotation therewith. The generator 24 may then be coupled to the rotor shaft 40 such that rotation of the rotor shaft 40 drives the generator 24. For instance, in the illustrated embodiment, the generator 24 includes a generator shaft 42 rotatably coupled to the rotor shaft 40 through a gearbox 44.

It should be appreciated that the rotor shaft 40, gearbox 44, and generator 24 may generally be supported within the nacelle 16 by a support frame or bedplate 46 positioned atop the wind turbine tower 12. Further, as shown, the gearbox 44 is typically mounted to the bedplate 46 via a torque arm 26 or trunnion which is used as a mounting point for the gearbox 44 and allows for limited movement of the gearbox 44 due to torque variations. As used herein, the torque arm 26 or trunnion generally refers to a protrusion used as a mounting and/or pivoting point. Accordingly, as shown in the illustrated embodiment, the torque arm 26 is generally mounted to the bedplate 46 via one or more trunnion pins 30 (FIGS. 2-3).

During operation, the gearbox 44 may become vertically displaced due to normal wear and tear and/or excessive loading. For example, in some instances, the trunnion pins 30 that secure the gearbox 44 to the bedplate 46 and/or their corresponding bore holes may become worn, thereby causing displacement of the gearbox 44. Accordingly, the present disclosure is directed to a gearbox repair apparatus configured to repair the trunnion bore holes 29 and replace the trunnion pin 30 with a new pin after the bore hole 29 has been replaced.

In certain embodiments, the gearbox repair apparatus of the present disclosure may be used in conjunction with the gearbox adjustment system described in General Electric Company's U.S. patent application entitled "Gearbox Adjustment System," application Ser. No. 14/687,976 filed on Apr. 16, 2015, which is incorporated herein by reference in its entirety. For example, in certain embodiments, the gearbox repair apparatus of the present disclosure may be used to repair the trunnion bore holes 29 and replace the trunnion pins 30 of the gearbox 44 while the gearbox adjustment system of the above application is used to restrain movement of the gearbox 44. Further, in additional embodiments, the gearbox adjustment system of the above application may adjust a height of the gearbox 44 (i.e. by vertically lowering the gearbox 44 when it has shifted up due to gravity) before the gearbox 44 repair apparatus of the present disclosure is used.

Referring to FIG. 3, the damaged pin 30 may be removed via a pulling device 78. For example, as shown, the pulling device 78 may be a hydraulic pulling device 78 that can be mounted to the torque arm 26 via one or more mounting arms 80. As such, the hydraulic cylinder is configured to remove the trunnion pin 30 from the damaged bore hole 29. After removing the damaged trunnion pin 30 from the bore hole 29, the pulling device 78 can be removed such that the gearbox repair apparatus 50 can be installed.

More specifically, as shown in FIGS. 4-13, various views of the gearbox repair apparatus 50 according to the present disclosure are illustrated. It should be understood by those of ordinary skill in the art that the figures are provided as examples only and are not meant to be limiting. More specifically, FIGS. 4 and 9 illustrate partial, perspective views of a gearbox repair apparatus 50 mounted to a torque arm 26 or trunnion of the gearbox 44 according to the present disclosure. More specifically, as shown generally in FIGS. 4-5 and 9-12, the gearbox repair apparatus 50 includes a mounting structure 52 configured to mount to the torque arm 26. Further, the mounting structure 52 includes a through hole 56 that aligns with the bore hole 29 of the torque arm 26 when mounted thereto. As such, when mounted to the torque arm 26, the mounting structure 52 is configured to locate a boring bar 58 at a center of the bore hole 29 such that the boring bar 58 is perpendicular to a face 45 of the torque arm 26, e.g. as shown in FIG. 10, regardless of a location of the gearbox 44. More particularly, as shown, the mounting structure 52 locates the boring bar 58 such that the boring bar 58 remains parallel to an axis 48 that is perpendicular to the face 45 of the torque arm 26. As such, even if the gearbox 44 has shifted during operation, the gearbox repair apparatus 50 can efficiently repair the bore hole 29 as the boring bar 58 references the mounting structure 52 which remains aligned with the bore hole 29 when mounted to the torque arm 26. In addition, the mounting structure 52 is configured to receive the boring bar 58 through the aligned through hole 56 and bore hole 29 such that, when inserted therethrough, the boring bar 58 is configured to machine the bore hole 29 to ensure a round, repaired bore hole 29 without defects.

The boring bar 58 as described herein generally encompasses any suitable tool used to bore a hole. For example, as shown, the boring bar 58 comprises a cylindrical bar having a substantially round cross-sectional shape. However, in further embodiments, the boring bar 58 may have any suitable shape and/or size. As such, the boring bar 58 is configured to machine, drill, and/or mill the bore hole 29 so as to increase a diameter thereof such that the new bore hole 29 is round and without defects. Accordingly, a new trunnion pin 30 can be inserted therethrough that ensures a proper shrink fit.

In particular embodiments, as shown in FIGS. 4 and 9-12, the mounting structure 52 may include a first mounting plate 54 and a second mounting plate 55 configured on opposites sides of the torque arm 26 of the gearbox 26. Further, the first and second mounting plates 54, 55 may be mounted to the torque arm 26 via any suitable means. For example, as shown in FIG. 10, the first and second mounting plates 54, 55 are mounted to opposite sides of the torque arm 26 via one or more clamps 53. In additional embodiments, the first and second mounting plates 54, 55 may be mounted to the torque arm 26 via one or more fasteners (e.g. bolts, pins, screws, etc.) or similar. Further, as shown, each of the mounting plates 54, 55 may include corresponding through holes that align to the bore hole 29 when mounted to the torque arm 26. In addition, as shown in FIGS. 4, 7, 9, and 11-12, the first and second mounting plates 54, 55 may be secured to each other when mounted to opposite sides of the torque arm 26 via one or more connecting members 60. In certain embodiments, the connecting members 60 may increase stability of the mounting plates 54, 55 when mounted to the torque arm 26.

Referring now to FIGS. 4, 8-12, the gearbox repair apparatus 50 may also include a plurality of support members 62 configured with the mounting structure 52. For example, as generally illustrated, the plurality of support members 62 may include a first set 64 of support members mounted to the first mounting plate 54 and a second set 66 of support members mounted to the second mounting plate 55. In addition, the apparatus 50 may also include a first end plate 68 mounted to the first set 64 of support members and a second end plate 70 mounted to the second set 66 of support members. Accordingly, the support members 62 provide spacing between the end plates 68, 70 and the mounting structure 52. More specifically, as shown, the support members 62 extend a certain length on each side of the mounting structure 52 such that a total length of the gearbox repair apparatus 50 is approximately equal to or greater than a length of the boring bar 58 and its associated equipment head. As such, the gearbox repair apparatus 50 can easily pull the boring bar 58 into and through the mounting structure 52 such that the bar 58 can machine and repair the bore hole 29 of the torque arm 26.

In certain embodiments, the gearbox repair apparatus 50 may also include one or more connecting plates 76 configured between the end plates 68, 70 and the first and second sets 64, 66 of support members, respectively. For example, as shown in FIGS. 4 and 8-9, the connecting plates 76 provide a mounting point or surface for the first and second end plates 68, 70. In addition, the apparatus 50 includes a first support bearing 72 and a second support bearing 74 configured with the first and second end plates 68, 70, respectively. The first and second support bearings 72, 74 are configured to locate the boring bar 58 at the center of the bore hole 29 such that the boring bar 58 is perpendicular to the torque arm face 45 (i.e. parallel with the perpendicular axis 48). More specifically, the first and second support bearings 72, 74 may be any suitable bearing that constrains relative motion of the boring bar 58 to only the desired motion (i.e. rotational motion within the bore hole 29). Further, as shown particularly in FIG. 5, the apparatus 50 may include one or more adjustment components 65 configured with the boring bar 58. The adjustment components 65 are configured to make fine adjustments to the boring bar 58 such that the bar 58 can be accurately located with respect to the face 45 of the torque arm 26. More specifically, as shown, the adjustment components 65 may generally include one or more fasteners 67 configured to tighten and/or loosen the boring bar 58 so as to fine adjust its position.

Once the gearbox repair apparatus 50 has been mounted to the torque arm 26 and the boring bar 58 is properly located via the first support bearing 72 (FIG. 4), the boring bar 58 can then inserted into the bore hole 29 and supported via the second support bearing 74 (FIGS. 10-12). The boring bar 58 is then configured to machine the damaged bore hole 29 by rotating within the bore hole so as to increase a diameter thereof. As such, the repaired bore hole 29 is larger in size than the original bore hole. The boring bar 58 is then removed such that a new trunnion pin 30 (also having a larger diameter than the original trunnion pin) can be inserted through the repaired bore hole 29. For example, in certain embodiments, the new trunnion pin 30 may be inserted into the repaired trunnion bore hole 29 via the pulling device 78 (FIG. 3). More specifically, in certain embodiments, the pulling device 78 may include a hydraulic pulling device.

Referring now to FIG. 13, a flow diagram of one embodiment of a method 100 for repairing a bore hole 29 of a torque arm 26 is illustrated. As shown at 102, the method 100 includes removing a trunnion pin from the bore hole 29. At 104, the method 100 includes aligning, via a repair apparatus, a boring bar 58 at a center of the bore hole 29 such that the boring bar 58 is perpendicular to a face of the torque arm. At 106, the method 100 includes inserting, via the repair apparatus, the boring bar 58 through the bore hole 29. At 108, the method 100 includes machining, via the boring bar 58, the bore hole 29 so as to increase a diameter of the bore hole 29. At 110, the method 100 includes inserting a trunnion pin 30 into the repaired bore hole 29.

In one embodiment, for example, the step 104 of aligning the boring bar at the center of the bore hole may include locating the boring bar on a support bearing of the mounting structure. In another embodiment, the step 106 of inserting the trunnion pin into the repaired bore hole may further include cooling the trunnion pin so as to shrink the pin, heating the torque arm 26 such that the torque arm 26 expands, and pulling, via a pulling device 78, the trunnion pin 30 into the repaired trunnion bore hole 29. For example, in certain embodiments, the new trunnion pin 30 may oversized by, e.g. approximately 10 millimeters in diameter. As such, before being inserted into the bore hole 29, the trunnion pin 30 may be cooled to a predetermined temperature so as to shrink the pin to a certain size such that the pin can be inserted through the repaired bore hole, e.g. via the pulling device 78. More specifically, in certain embodiments, the trunnion pin 30 may be cooled using dry ice or any other suitable cooling means. Similarly, the torque arm 26 may be heated using any suitable means known in the art. As such, when the trunnion pin 30 warms up and the torque arm 26 cools down, the trunnion pin 30 can be pulled into the repaired bore hole 29 via the pulling device 78 such that the pin 30 is securely installed within the torque arm 26 via a shrink fit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An apparatus for repairing a bore hole of a gearbox torque arm, the apparatus comprising:
    a mounting structure configured to mount to the torque arm, the mounting structure comprising a first mounting plate, a second mounting plate, and a plurality of connecting members, each of the plurality of connecting members being positioned through and between each of the first and second mounting plates so as to secure the first and second mounting plates together on opposites sides of the torque arm, the first and second mounting plates each comprising a respective through hole, wherein, when the mounting structure is arranged with the torque arm, the through holes of the first and second mounting plates and the bore hole define a continuous channel; and
    a boring bar secured to the mounting structure,
    wherein, when the mounting structure is arranged with the torque arm, the channel is configured to locate the boring bar such that the boring bar is perpendicular to a face of the torque arm, the boring bar being configured to repair the bore hole;
    the apparatus further comprising:
    a plurality of support members, wherein the plurality of support members comprise a first set of support members and a second set of support members, the first set of support members being mounted to the first mounting plate, the second set of support members being mounted to the second mounting plate;
    a first end plate;
    a second end plate;
    a first set of connecting plates configured between the first end plate and the first set of support members; and
    a second set of connecting plates configured between the second end plate and the second set of support members.

2. The apparatus of claim 1, wherein the first and second mounting plates are mounted to opposite sides of the torque arm via one or more clamps.

3. The apparatus of claim 1, further comprising a first support bearing and a second support bearing configured with the first end plate and the second end plate, respectively.

4. The apparatus of claim 1, further comprising a pulling device configured to remove a trunnion pin from the bore hole.

5. The apparatus of claim 4, wherein the pulling device is also configured to pull a trunnion pin into the repaired bore hole of the torque arm.

6. The apparatus of claim 1, wherein the boring bar is configured to repair the bore hole by machining the bore hole so as to increase a diameter of the bore hole.

* * * * *